United States Patent Office 3,073,677
Patented Jan. 15, 1963

3,073,677
PHOSPHORIC ACID
Thomas J. Malley, Stamford, and Darwin F. De Lapp, New Canaan, Conn., assignors to American Cyanamid Company, New York, N.Y., a corporation of Maine
No Drawing. Filed July 7, 1960, Ser. No. 41,265
2 Claims. (Cl. 23—165)

The present invention relates to the improvement of wet phosphoric acid. More particularly, the instant discovery concerns the improvement of wet phosphoric acid prepared from phosphatic minerals by digestion with sulfuric acid, which wet phosphoric acid generally contains dissolved iron and aluminum.

A conventional way of preparing commercial wet phosphoric acid involves the following equation:

$$Ca_3(PO_4)_2 + 3H_2SO_4 + 6H_2O \rightarrow 3CaSO_4 \cdot 2H_2O + 2H_3PO_4 + 4H_2O$$

Generally, phosphatic rock containing about 30 percent $P_2O_5$ by weight is digested with sulfuric acid and the resulting slurry filtered to separate gypsum $$(3CaSO_4 \cdot 2H_2O)$$

solids. While substantially all the gypsum is removed the remaining aqueous acid or wet phosphoric acid containing about 44 percent $H_3PO_4$ by weight is evaporated to increase its $H_3PO_4$ concentration to a range of 55 to 82 percent by weight, preferably 70 to 80 percent by weight.

It is this product which is sold to the agricultural industry for reacting and mixing with other plant nutrients to produce complete fertilizers. Very often the wet process phosphoric acid is admixed with ammonia, or the like, in order to produce the complete fertilizers just mentioned. In other words, the wet phosphoric acid is neutralized in the presence of nitrogen, nitrogen and potassium, or the like.

Unfortunately, the art has experienced through the years that the aluminum and iron dissolved in the wet phosphoric acid contemplated herein forms a heavy gelatinous mass and heavy precipitates upon neutralization with ammonia. Obviously, this is very undesirable both from the point of view of the production of a complete liquid fertilizer, the conveyance of same through conduits, etc.

Waggaman, "Phosphoric Acid, Phosphates and Phosphatic Fertilizers" (1952), 2d edition, page 189, a leading authority in this field has this to say about further problems attending the contaminants iron and aluminum:

"In purifying phosphoric acid produced by the wet process, contaminants such as iron and aluminum may be recovered by partial neutralization of the acid with limestone or soda ash.

"The precipitates thus formed consist largely of iron and aluminum phosphates and though they represent a loss of $P_2O_5$ from the acid solution, they are largely citrate soluble and when dried have a distinct value for fertilizer purposes."

It is clear from the above that the iron and aluminum contaminants have long been a problem. Certainly, removal of the dissolved iron and aluminum would be costly and cumbersome on a large scale and therefore out of the question from a commercial viewpoint. According to the present invention, however, a practical, straightforward answer to the problem has been discovered. A method has been found for improving wet phosphoric acid prepared from phosphatic minerals by digestion with sulfuric acid, the wet phosphoric acid containing dissolved iron and aluminum.

According to the present invention a method has been found for improving wet phosphoric acid prepared from phosphatic minerals by digestion with sulfuric acid, said acid containing by weight from about 30.0 percent to 64 percent $P_2O_5$, from 0.5 percent to 54.0 percent free water, from 0.4 percent to 2.5 percent dissolved iron computed as $Fe_2O_3$, and from 0.4 percent to 3.7 percent dissolved aluminum computed as $Al_2O_3$, said iron and aluminum having the tendency to come out of solution and solidify upon neutralization of said acid with ammonia, which comprises removing at least about 95 percent by weight of said water by subjecting said acid to a temperature in the range of 50° C. to 250° C. but discontinuing said removal of water before the $P_2O_5$ concentration of said acid exceeds 72 percent by weight, thus effecting the retention in solution of the iron and aluminum even upon neutralization with ammonia.

According to a preferred embodiment, the wet phosphoric acid is subjected to a temperature in the range of 80° C. to 200° C. at a subatmospheric pressure in the range of 12.5 millimeters to 250 millimeters (usually 50 millimeters to 200 millimeters) until substantially (at least) all free water is removed and until, upon neutralization of the thus-treated acid with ammonia, substantially no lasting precipitate forms and the fluid remains virtually clear of gelatinous precipitate.

In effect, therefore, the present invention provides a novel method whereby commercial wet phosphoric acid is improved upon to such an extent that its use, for example, in the preparation of complete liquid fertilizers is not impaired by precipitation of gel-formation caused by iron and aluminum generally present in the acid.

The thus-improved acid is tested by admixing it with water, for example, with about 3 parts of water per part of improved acid, and neutralizing the resulting solution with aqueous ammonia while stirring. If at least about 95 percent of the free water has been removed from the acid and removal of water is discontinued before the $P_2O_5$ concentration exceeds 72 percent by weight, addition of ammonia to a pH of, say, about 7.5 does not cause the iron and aluminum to form a lasting precipitate or a gelatinous mass.

According to a typical embodiment wet phosphoric acid having the following analysis.

| Components: | Concentration and by weight |
|---|---|
| $P_2O_5$ | 54.5 |
| $H_2SO_4$ | 3.0 |
| Fluorine (F) | 1.4 |
| Iron as iron oxide | 1.3 |
| Aluminum (as $Al_2O_3$) | 1.5 |
| $H_2O$ | 16.0 | is brought to a temperature of about 110° C. and maintained under these conditions until at least substantially all free water contained therein is taken over, i.e., at least about 95% by weight thereof, thus increasing the $P_2O_5$ concentration proportionately. Once the water has been taken off, according to a preferred embodiment, the temperature and pressure are maintained for a short while longer but discontinued before the $P_2O_5$ concentration of the acid exceeds 72 percent by weight, usually when the $P_2O_5$ concentration is in the range of 66 to 70 percent by weight. Five grams of the thus-treated phosphoric acid is then admixed with 15 milliliters of water and neutralized with aqueous ammonia while stirring. A small percipitate of iron and aluminum phosphate begins to form at about a pH of 2 but quickly disappears on the addition of further ammonia and the resulting solution is clear at about a pH of 7.5.

As aforementioned, temperatures in the range of 50° C. to 250° C. are suitable; preferably, however, temperatures in the range of 80° C. to 200° C. are employed. Likewise, a wide range of pressures are contemplated herein, say, from 12.5 millimeters to 250 millimeters, preferably 50 millimeters to 200 millimeters mercury. Although preferred for convenience and ease of operation, it is not absolutely necessary to operate below atmospheric pressure.

According to a preferred embodiment of the instant discovery, the wet phosphoric acid is brought to temperature after vacuum has been applied an the water content of the acid removed at a fairly steady rate. The purpose of this is to minimize foaming which usually attends attempts to hurry the removal of water. At atmospheric pressure, also, foaming is more prevalent.

The forming are analyses of typical wet phosphoric acids contemplated herein which are prepared from phosphatic minerals by digestion with sulfuric acid; in addition, the following tabulation provides a broad spectrum of acids within the purview of the instant discovery:

TABLE I

| W.P.A. Components | Concentrations, percent by weight | | |
|---|---|---|---|
| | Typical | Range | |
| | | Low | High |
| $P_2O_5$ | 31.1 | 30.0 | 64 |
| $H_3PO_4$ | 42.9 | 41.4 | 90 |
| $H_2SO_4$ | 2.8 | 1.7 | 6.5 |
| F | 2.4 | 0.4 | 3.2 |
| $Fe_2O_3$ | 0.82 | 0.4 | 2.5 |
| $Al_2O_3$ | 0.76 | 0.4 | 3.7 |
| Ca | 0.07 | 0.0 | 0.5 |
| $SiO_2$ | 0.71 | 0.3 | 3.5 |
| $H_2O$ | 51.8 | 0.5 | 54.0 |

A typicaly specific gravity reading of these acids at 60° C. is 1.365.

In connection with the instant invention reference is hereby made to copending U.S. application Serial No. 4,169, filed January 25, 1960, which is incorporated herein by reference. This application is likewise concerned with the improvement of commercial wet phosphoric acid. The improvement described therein comprises a method of treating the wet phosphoric acid with a relatively small amount of an alkali salt of hydrolyzed polyacrylonitrile having an average molecular weight of at least 25,000. The polymer is intimately admixed with the acid and then allowed to settle; upon settling it removes a very substantial amount of troublesome suspended solids usually present in a concentration of up to 5 percent by weight, basis the wet phosphoric acid.

The present invention is particularly effective with wet phosphoric acid which has been pre-treated according to U.S. Serial No. 4,169. However, it is not necessary that the suspended solids be removed prior to effecting the process of the present invention. Nevertheless, it should be understood that the process whereby the suspended solids are removed and the resulting acid is treated as contemplated herein effects an operational advantage which is extremely desirable both in handling and use of the thus-improved phosphoric acid.

The process of the present invention may be carried out in a continuous, semi-continuous or batch manner.

While it is not intended that the discovery described herein be limited thereby, the following examples are provided to further illustrate what has been discussed hereinabove:

*Example I*

Five hundred grams of decanted wet process phosphoric acid containing 32 percent by weight $P_2O_5$ (44.1 percent by weight calculated as orthophosphoric acid $H_3PO_4$), 50 percent by weight $H_2O$, and 1.58 percent by weight total iron and aluminum (calculated as their oxides) is charged to a vacuum distillation apparatus. Evaporation of the contained water is carried out at a pressure of 50 to 150 millimeters of mercury and at temperatures of 65° C. to 80° C. After the evaporation of 204 grams of water the phosphoric acid solution contains 54 percent by weight $P_2O_5$ or 74.5 percent by weight calculated as orthophosphoric acid.

The 54 percent $P_2O_5$ acid is then diluted to 15 percent by weight with water in order to make a liquid fertilizer. The diluted acid is now neutralized with aqua or anhydrous ammonia to a pH of 7.8. In the course of the neutralization a brown, gel-like precipitate of iron and alumina phosphates forms and persists in spite of vigorous agitation.

This example clearly illustrates the unfortunate effect of neutralization of commercial wet process phosphoric acid which usually has an $H_3PO_4$ concentration in the range of 55 to 82 percent by weight. Obviously, this effect is very troublesome when the acid is to be used with ammonia, or the like, to make complete liquid fertilizers.

Now let use see what effect treatment by the process of the present invention has on this same starting acid.

*Example II*

Five hundred grams of decanted wet process phosphoric acid containing 32 percent by weight $P_2O_5$ (44.1 percent by weight calculated as orthophosphoric acid $H_3PO_4$), 50 percent by weight $H_2O$, and 1.58 percent by weight total iron and aluminum (calculated as their oxides) is charged to a vacuum distillation apparatus. Evaporation of the contained water is carried out at a pressure of 50 to 150 millimeters of mercury and at temperatures of 60° C. to 80° C. until the $P_2O_5$ content of the acid reaches 60 percent by weight. At this point the temperature is gradually increased, the evolution of water is accompanied by frothing in the acid. When a total of 272 grams of water has been removed from the sample and the temperature of the acid has reached 135° C.–150° C., the $P_2O_5$ content is then 70 percent by weight (96.5 percent by weight calculated as orthophosphoric acid).

As in Example I, above, the concentrated acid is diluted with water to 15 percent by weight $P_2O_5$ and neutralized to a pH of 7.8 with ammonia. A brown flocculent precipitate starts to form at a pH of about 2, but this readily disappears with agitation as the pH increases, leaving a clear black liquor in which the iron and aluminum are dissolved.

*Example III*

One hundred grams of decanted wet process phosphoric acid containing 32 percent by weight $P_2O_5$ (44.1 percent by weight calculated as orthophosphoric acid), 50 percent by weight $H_2O$, and 1.58 percent by weight total iron and aluminum (calculated as their oxides) weighed into an evaporating dish and heat applied to the bottom of the dish. The temperature of the material is raised gradually with stirring until the acid reaches a temperature of 250° C., at which point about 54 grams of water has been evaporated and the $P_2O_5$ content of the acid is about 70 percent by weight (i.e., 96.5 percent by weight $H_3PO_4$).

As in Example II the acid is diluted to 15 percent by weight $P_2O_5$ with water and neutralized with ammonia without the formation of a stable gelatinous precipitation of iron and aluminum phosphates.

*Examples IV–VI*

In each of the following examples, Example II, above, is repeated in every essential respect with the exception that the conditions are varied as follows:

TABLE II [1]

| Example | Phosphoric Acid | | | | Temperature, °C. | Pressure, millimeters mercury | Product, $P_2O_5$ |
|---|---|---|---|---|---|---|---|
| | $P_2O_5$ | $H^2O$ | Al | Fe | | | |
| IV | 50 | 30 | 1.0 | 1.8 | 50 | 100 | 68 |
| V | 60 | 10 | 2.2 | 1.6 | 200 | 130 | 67 |
| VI | 62 | 5 | 0.9 | 0.8 | 95 | 0 | 71 |

[1] Both Al and Fe are computed as their oxides; by "Product" is meant the resulting acid after at least 95 percent by weight of its $H_2O$ content is removed and the $P_2O_5$ concentration given in the table is reached.

As indicated hereinabove, it has been found pursuant to the instant discovery that when at least 95 percent by weight of the water content of the acid is removed and the $P_2O_5$ concentration is in the range of 66 to 72 percent by weight, neutralization of the acid with ammonia does not result in precipitation of the dissolved iron and aluminum.

Clearly, the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

We claim:
1. In a method for preparing an improved, non-filterable, fluoride-containing wet phosphoric acid capable of being admixed with other plant nutrients to prepare a complete liquid fertilizer, said phosphoric acid being substantially free from aluminum and iron ion precipitation when neutralized with ammonia, the improvement which comprises the steps of: digesting phosphate rock with sulfuric acid in an aqueous environment to prepare a mixture of calcium sulfate and crude wet phosphoric acid, the latter containing about 30% to 64% $P_2O_5$, 0.5%–54% free water, 0.4% to 3.2% fluoride ion calculated as fluorine, 0.4% to 2.5% iron, calculated as ferrous oxide, and 0.4% to 3.7% aluminum, calculated as aluminum oxide; filtering the resultant mixture to remove therefrom calcium sulfate; concentrating the thus-obtained filtrate containing said iron aluminum and fluoride impurities by heating the same to a temperature between about 50° C. and 250° C. under a reduced pressure of about 12.5 mm. to about 250 mm., thereby eliminating at least 95% of the free water; intermittently removing a portion of the so-concentrated wet phosphoric acid; subjecting the latter portion to neutralization with ammonia; terminating the aforementioned concentration operation of the remaining portion at the instant when iron and aluminum ions in a removed portion of the so-concentrated wet phosphoric acid do not precepitate in the form of their corresponding phosphate salts thereby establishing a $P_2O_5$ content in said acid ranging between 66% and 72%; and thereafter recovering a non-filterable, fluoride-containing, wet phosphoric acid having a $P_2O_5$ content ranging between about 66% to 72%, all percentages mentioned above being by weight.

2. The process of claim 1, wherein the $P_2O_5$ concentration of the resultant wet phosphoric acid ultimately prepared is in the range between about 67% and 70% by weight.

References Cited in the file of this patent

UNITED STATES PATENTS

| 2,165,100 | Hettrick | July 4, 1939 |
| 2,917,367 | Hodges et al. | Dec. 15, 1959 |
| 2,933,372 | Manning | Apr. 19, 1960 |
| 2,950,961 | Striplin et al. | Aug. 30, 1960 |